United States Patent
Vange et al.

(10) Patent No.: US 7,111,006 B2
(45) Date of Patent: Sep. 19, 2006

(54) SYSTEM AND METHOD FOR PROVIDING DISTRIBUTED DATABASE SERVICES

(75) Inventors: Mark Vange, Toronto (CA); Marco Clementoni, Toronto (CA)

(73) Assignee: Circadence Corporation, Boulder, CO (US)

( * ) Notice: Subject to any disclaimer, the term of this patent is extended or adjusted under 35 U.S.C. 154(b) by 39 days.

(21) Appl. No.: 09/835,873

(22) Filed: Apr. 16, 2001

(65) Prior Publication Data
US 2002/0004796 A1 Jan. 10, 2002

Related U.S. Application Data

(60) Provisional application No. 60/197,490, filed on Apr. 17, 2000.

(51) Int. Cl.
*G06F 17/30* (2006.01)

(52) U.S. Cl. .......... 707/10; 707/103 R; 707/104.1; 709/200; 709/201; 709/202; 709/203

(58) Field of Classification Search .......... 707/3, 707/9, 522, 523, 10, 104.1, 103 R, 203; 709/200, 709/201, 202
See application file for complete search history.

(56) References Cited

U.S. PATENT DOCUMENTS

| 5,258,983 A | 11/1993 | Lane et al. |
|---|---|---|
| 5,673,322 A | 9/1997 | Pepe et al. |
| 5,757,771 A | 5/1998 | Li et al. |
| 5,933,412 A | 8/1999 | Choudhury et al. |
| 5,951,694 A | 9/1999 | Choquier et al. |
| 5,999,971 A | 12/1999 | Buckland |
| 6,006,264 A | 12/1999 | Colby et al. |
| 6,023,456 A | 2/2000 | Chapman et al. |
| 6,034,964 A | 3/2000 | Fukushima et al. |
| 6,047,327 A * | 4/2000 | Tso et al. .......... 709/232 |
| 6,125,304 A * | 9/2000 | Suzuki .......... 700/182 |
| 6,148,307 A * | 11/2000 | Burdick et al. .......... 707/104.1 |
| 6,167,449 A | 12/2000 | Arnold et al. |
| 6,334,126 B1 * | 12/2001 | Nagatomo et al. .......... 707/4 |
| 6,449,647 B1 * | 9/2002 | Colby et al. .......... 709/226 |
| 6,502,175 B1 * | 12/2002 | Krishnan et al. .......... 711/170 |

(Continued)

FOREIGN PATENT DOCUMENTS

EP 0384339 A2 8/1990

(Continued)

OTHER PUBLICATIONS

K. Sriram, "Methodologies for bandwidth allocation, transmission scheduling, and congestion avoidance in broadband ATM networks", Computer Networks and ISDN Systems, 26 (1993) pp. 43-59.

(Continued)

*Primary Examiner*—Frantz Coby
(74) *Attorney, Agent, or Firm*—Stuart T. Langley; Kent A. Lembke; Hogan & Hartson (57) ABSTRACT

A database system operating over a communication network. A plurality of client applications coupled to the network generate database access requests. An intermediary server coupled to the network receives the requests. A data storage mechanism coupled to the network has an interface for communicating with the intermediary servers. The intermediary server is responsive to a received database access request to establishing a channel with the data storage mechanism to obtain data from the data storage mechanism in response to a received client request. The intermediary server is further operable to format the obtained data in a manner suitable for use by one of the client applications that requested the associated database access.

17 Claims, 8 Drawing Sheets

U.S. PATENT DOCUMENTS

| | | | |
|---|---|---|---|
| 6,519,598 B1 * | 2/2003 | Nishizawa et al. | 707/10 |
| 6,553,413 B1 * | 4/2003 | Leighton et al. | 709/219 |
| 6,621,422 B1 * | 9/2003 | Rubenstein | 340/988 |
| 6,675,178 B1 * | 1/2004 | Chinchar et al. | 707/201 |
| 6,850,974 B1 * | 2/2005 | Schweitzer et al. | 709/223 |
| 6,943,703 B1 * | 9/2005 | Rubenstein | 340/988 |

FOREIGN PATENT DOCUMENTS

| | | |
|---|---|---|
| EP | 0794491 A2 | 9/1997 |
| EP | 0828214 A2 | 3/1998 |
| EP | 0942363 A2 | 9/1999 |
| GB | 2309558 | 7/1997 |
| WO | WO 97/29424 | 8/1997 |
| WO | WO 97/30392 | 8/1997 |
| WO | WO 98/26553 | 6/1998 |
| WO | WO 98/28938 | 7/1998 |
| WO | WO 99/09689 | 2/1999 |
| WO | WO 99/18534 | 4/1999 |
| WO | WO 99/57620 | 11/1999 |
| WO | WO 99/57637 | 11/1999 |
| WO | WO 0239355 A1 * | 5/2002 |

OTHER PUBLICATIONS

V. P. Kumar, et al., "Beyond Best Effort: Router Architectures for the Differentiated Services of Tomorrow's Internet", May 1998, IEEE Communications Magazine, pp. 152-164.

R. M. Adler, "Distributed Coordination Models for Client/Server Computing", Apr. 1995, IEEE Computer, pp. 14-22.

G.-C. Lai, et al., "Support QoS in IP over ATM", Computer Communications, 22 (1999) pp. 411-418.

* cited by examiner

SYSTEM AND METHOD FOR PROVIDING DISTRIBUTED DATABASE SERVICES

RELATED APPLICATIONS

The present invention claims priority from U.S. Provisional Patent Application No. 60/197,490 entitled CONDUCTOR GATEWAY filed on Apr. 17, 2000.

BACKGROUND OF THE INVENTION

1. Field of the Invention

The present invention relates, in general, to network information access and, more particularly, to software, systems and methods for providing database services in a coordinated fashion from multiple cooperating database servers.

2. Relevant Background

Increasingly, business data processing systems, entertainment systems, and personal communications systems are implemented by computers across networks that are interconnected by internetworks (e.g., the Internet). The Internet is rapidly emerging as the preferred system for distributing and exchanging data. Data exchanges support applications including electronic commerce, broadcast and multicast messaging, videoconferencing, gaming, and the like. In electronic commerce (e-commerce) applications, it is important to provide a satisfying buying experience that leads to a purchase transaction. To provide this high level of service, a web site operator must ensure that data is delivered to the customer in the most usable and efficient fashion. Also, the web site operator must ensure that critical data received from the customer is handled with priority.

A vast amount of information is stored in databases. These databases have been developed over time with different schemas, formats, and database management systems. Databases vary from 20 year old (or more) "legacy" systems to modern object oriented database systems. In most cases, a database was developed for a particular application to be used by a defined set of computers either directly or over a local area network. In such cases, the computers and users could readily be specially configured and trained to use the database. However, these systems are difficult to expand to new computers and users.

With the advent of the Internet, computing appliances that can potentially act as interfaces to a database have potentially ubiquitous access to this stored database information. Public network and, in particular, the Internet promise to enable ready access from a wide variety of computing appliances at a wide variety of locations. However, public networks do not inherently support the various formats required by the wide variety of existing database systems. As a result, much of the stored information is not available to Internet users.

The Internet is a collection of disparate computers and networks coupled together by a web of interconnections using standardized communications protocols. While most Internet access is currently performed using conventional personal computers and workstations, the variety of devices that access the Internet is growing quickly and expected to continue to grow. Wireless devices such as telephones, pagers and connected personal digital assistants (PDAs) are increasingly common. It is expected that a variety of appliances and devices within offices, businesses, and households will support Internet connectivity in the coming years. As a result, supporting interfaces to these devices has become a significant issue in the problems associated with providing services over the Internet, including database services. For example, it is desirable to format data returned to a cellular phone or pager much differently than might be desirable on a workstation having a high bandwidth connection and advanced graphics processing and display capability. Conventional database systems do not recognize the different demands required by such diverse access devices.

The Internet is characterized by its vast reach as a result of its wide and increasing availability and easy access protocols. Unfortunately, the heterogeneous nature of the Internet results in variable bandwidth and quality of service between points. The latency and reliability of data transport is largely determined by the total amount of traffic on the Internet and so varies wildly seasonally and throughout the day. Other factors that affect quality of service include equipment outages and line degradation that force packets to be rerouted, damaged and/or dropped. Also, routing software and hardware limitations within the Internet infrastructure may create bandwidth bottlenecks even when the mechanisms are operating within specifications. The variable nature of the quality of service (QOS) provided by the Internet has made development and deployment of database systems that leverage the Internet infrastructure difficult.

Current methods of database access involve configuring an intermediate front-end server, such as a web-server, to interface with the database system. A web designer creates an input form on a browser interface comprising one or more HTML input controls. The HTML is converted to XML in most cases due to the increased functionality available through the XML language. The XML is processed by a server that generates query language messages in the database's native query language.

For more complex, high volume database environments, a database management system (such as Oracle) implements a web "listener" that monitors its network interface and identifies dB query/management related packets. The packets must be properly formed at the client, but the query may be embedded in a conventional HTTP packet. The listener creates a socket for the database access request/response. Listeners are closely coupled to the database themselves, however, and typically are implemented by software processes that are dedicated to a particular database type.

In either type of implementation, the web server interface easily becomes a critical bottleneck in database performance. Even where the underlying database systems are designed for high volume, the web server that presents that database to the Internet has limited resources for processing requests. These resources include software and hardware resources within the web server that create and maintain connections to clients, as well as resources used to translate requests into a database recognized format and translate responses to formats that can be recognized by clients. Many web servers may be required to support even modest activity rates. This becomes difficult and expensive for the database owner to establish and administer.

As a result of these difficulties, it is a significant undertaking for the owner of a database to place the contents on-line through the Internet. In e-commerce environments, for example, catalogs, inventories, customer support databases and the like cannot be easily made network accessible. Alternatively, database owners may be required to upgrade databases to more net-accessible forms. Although this may make maintenance easier, this often compromises database performance. In many cases, database owners create a shadow copy of an operational database so that the Internet access port can use the shadow database rather than the operational database. Such solutions face the same mapping difficulties discussed above, with the additional task of periodically synchronizing the operational database to the shadow copies. Nevertheless, the shadow copy is almost always out of date to a degree and so is not effective for applications with volatile data such as many e-commerce applications.

Internet transport protocols do not discriminate between users. Data packets are passed between routers and switches that make up the Internet fabric based on the hardware's instantaneous view of the best path between source and destination nodes specified in the packet. Because each packet may take a different path, the latency of a packet cannot be guaranteed and, in practice, varies significantly. Likewise, data packets are routed through the Internet without any prioritization based on content.

Conventional database systems also lack prioritization features. However, in an Internet environment, it is desirable to prioritize some database access requests over others. For example, a request for a stock ticker code and a request for current stock value have very different needs. A ticker code is static while the stock value information changes rapidly. This information may reside in a single database, however, and the database software typically does not prioritize one request over another. Even where multiple databases are used, these disparate priority requests are often routed through the same web server that connects the databases to the Internet. A need exists for a system and method that enables database access in a manner that enables prioritization of requests and responses.

Prioritization has not been an issue with conventional database systems operated over local area networks (LANs) and wide area networks (WANs) because the average latency of such networks has been sufficiently low and sufficiently uniform to provide acceptable performance to all users. However, there is an increasing demand for network applications such as database services that cannot tolerate high and variable latency. This situation is complicated when the application is to be run over the Internet where latency and variability in latency are many times greater than in LAN and WAN environments.

A particular need exists in environments that involve multiple users accessing a shared network resource such as a database server or database management system. Examples include broadcast, multicast and videoconferencing as well as most electronic commerce (e-commerce) applications. In these applications, it is important to maintain a reliable connection so that the server and clients remain synchronized and information is not lost.

Another trend in database services is to implement a database in a distributed fashion across multiple servers. These servers are often geographically and/or logically distributed in a network topology. Distributed databases not only makes the variable QOS issues more relevant and harder to solve, but may also require greater duplication of resources that must be maintained to manage access to the databases in a coordinated fashion. A distributed database system may distribute the data itself to various servers, the services and functionality required to access the databases (e.g., query formulation and processing) remain essentially confined to the server upon which they are implemented. A need exists for systems and methods for distributing the functionality provided by a database management and access system throughout a network environment.

SUMMARY OF THE INVENTION

Briefly stated, the present invention involves a database system operating over a network. A plurality of client applications coupled to the network generate database access requests. An intermediary server coupled to the network receives the requests. A data storage mechanism coupled to the network has an interface for communicating with the intermediary servers. The intermediary server is responsive to a received database access request to establishing a channel with the data storage mechanism to obtain data from the data storage mechanism in response to a received client request. The intermediary server is further operable to format the obtained data in a manner suitable for use by one of the client applications that requested the associated database access.

In another aspect, the present invention involves a database access mechanism in which a plurality of database access requests are received from client applications. A priority value is associated with each database access request. The requests are selectively applied to a data storage mechanism in an order at least partially based upon the relative priority values associated with the requests.

DETAILED DESCRIPTION OF THE PREFERRED EMBODIMENTS

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary, the present invention is applicable to significantly larger, more complex network environments, including wireless network environments, as well as small network environments such as conventional LAN systems.

In accordance with the present invention, some or all of the database services normally implemented at the database itself are instead implemented in one or more intermediary servers. For example, the intermediary server may implement a listener interface to detect database-type requests that would otherwise be detected directly by a database management system interface. The database services include prompting for user input, formulating properly formed database queries based on application or user parameters, receiving results from a data storage mechanism or database, filtering results, constraining results, and reformatting results in a manner suitable for use by a client application that generated the request. In some embodiments, the database results may be modified by the intermediary server to append additional information.

One feature of the present invention is that the front-end servers implemented as an interchangeable pool of servers, any one of which may be dynamically configured to provide the database application services. A redirection mechanism is enabled to select from an available pool of front-end servers and direct client request packets from the originating server to a selected front-end server. Preferably, the front-end server establishes and maintains an enhanced communication channel with the originating server. By enhanced, it is meant that the channel offers improved quality of service, lower latency, prioritization services, higher security transport, or other features and services that improve upon the basic transport mechanisms (such as TCP) defined for Internet data transport.

In this manner, the prioritization functionality to prefer some database access requests over others can be performed before the request is launched within the database or data storage mechanism. An intermediary server that is logically close to the client application requesting services is selected from the pool of front-end servers. The selected intermediary server is configured to provide a prioritizing channel to the database server or data storage mechanism.

Specific implementations of the present invention involve the use of "web server" software and hardware to implement intermediary servers. For purposes of this document, a web server is a computer running server software coupled to the World Wide Web (i.e., "the web") that delivers or serves web pages. The web server has a unique IP address and accepts connections in order to service requests by sending back responses. A web server differs from a proxy server or a gateway server in that a web server has resident a set of resources (i.e., software programs, data storage capacity, and/or hardware) that enable it to serve web pages using the resident resources whereas a proxy or gateway is an intermediary program that makes requests on behalf of a client to resources that reside elsewhere. A web server in accordance with the present invention may reference external resources of the same or different type as the services requested by a user, and reformat and augment what is provided by the external resources in its response to the user. Commercially available web server software includes Microsoft Internet Information Server (IIS), Netscape Netsite, Apache, among others. Alternatively, a web site may be implemented with custom or semi-custom software that supports HTTP traffic.

Figure 1:
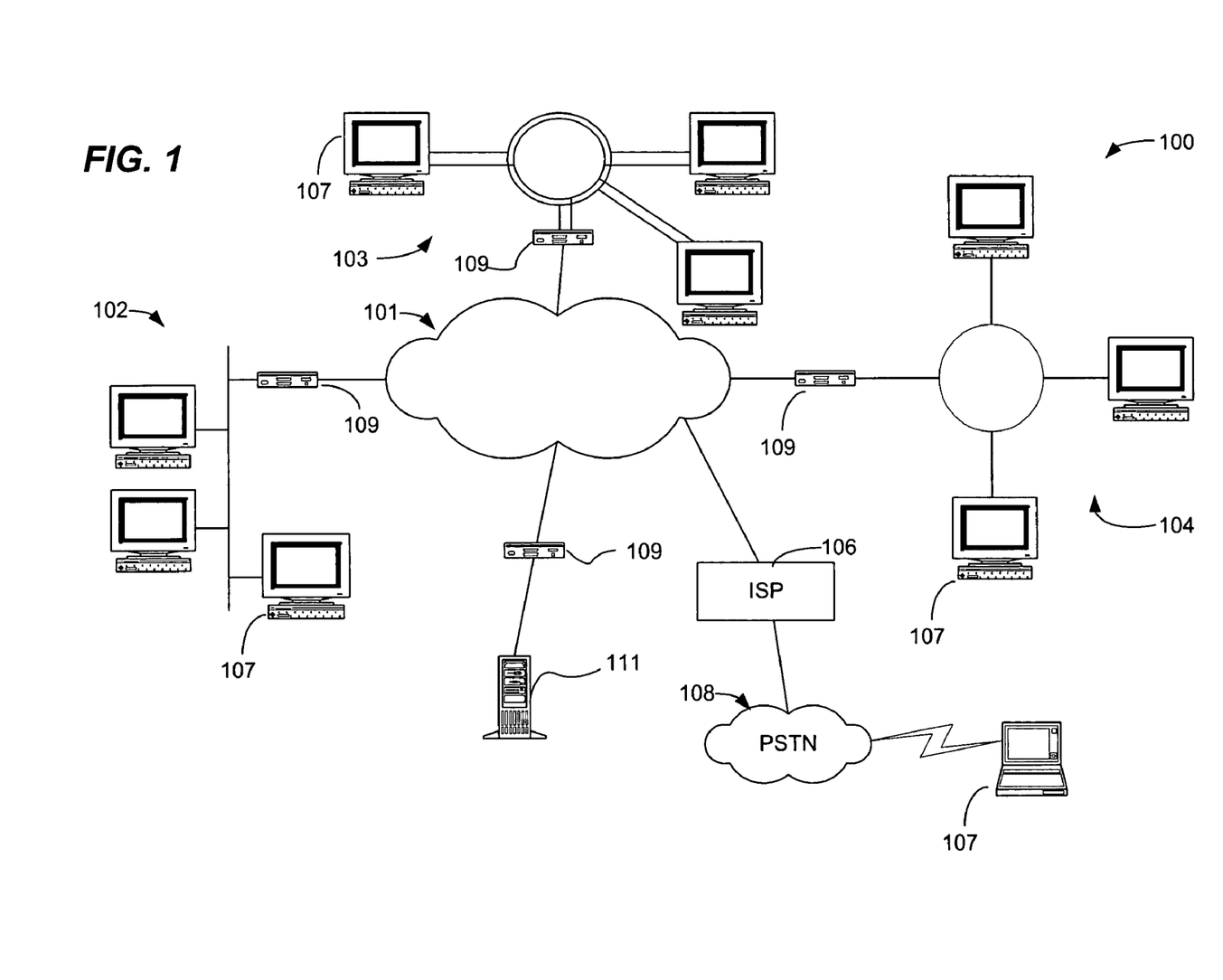
FIG. 1 illustrates a general distributed computing environment in which the present invention is implemented.

FIG. 1 shows an exemplary computing environment 100 in which the present invention may be implemented. Environment 100 includes a plurality of local networks such as Ethernet network 102, FDDI network 103 and Token Ring network 104. Essentially, a number of computing devices and groups of devices are interconnected through a network 101. For example, local networks 102, 103 and 104 are each coupled to network 101 through routers 109. LANs 102, 103 and 104 may be implemented using any available topology and may implement one or more server technologies including, for example UNIX, Novell, or Windows NT networks, or peer-to-peer type network. Each network will include distributed storage implemented in each device and typically includes some mass storage device coupled to or managed by a server computer. Network 101 comprises, for example, a public network such as the Internet or another network mechanism such as a fibre channel fabric or conventional WAN technologies.

Local networks 102, 103 and 104 include one or more network appliances 107. One or more network appliances 107 may be configured as an application and/or file server.

Each local network 102, 103 and 104 may include a number of shared devices (not shown) such as printers, file servers, mass storage and the like. Similarly, devices 111 may be shared through network 101 to provide application and file services, directory services, printing, storage, and the like. Routers 109 provide a physical connection between the various devices through network 101. Routers 109 may implement desired access and security protocols to manage access through network 101.

Network appliances 107 may also couple to network 101 through public switched telephone network 108 using copper or wireless connection technology. In a typical environment, an Internet service provider 106 supports a connection to network 101 as well as PSTN 108 connections to network appliances 107.

Network appliances 107 may be implemented as any kind of network appliance having sufficient computational function to execute software needed to establish and use a connection to network 101. Network appliances 107 may comprise workstation and personal computer hardware executing commercial operating systems such as Unix variants, Microsoft Windows, MacIntosh OS, and the like. At the same time, some appliances 107 comprise portable or handheld devices using wireless connections through a wireless access provider such as personal digital assistants and cell phones executing operating system software such as PalmOS, WindowsCE, EPOC and the like. Moreover, the present invention is readily extended to network devices such as office equipment, vehicles, and personal communicators that make occasional connection through network 101.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm (not shown) that provides mass storage capacity beyond what an individual device can efficiently use and manage. Selected components of the present invention may be stored in or implemented in shared mass storage.

Figure 2:
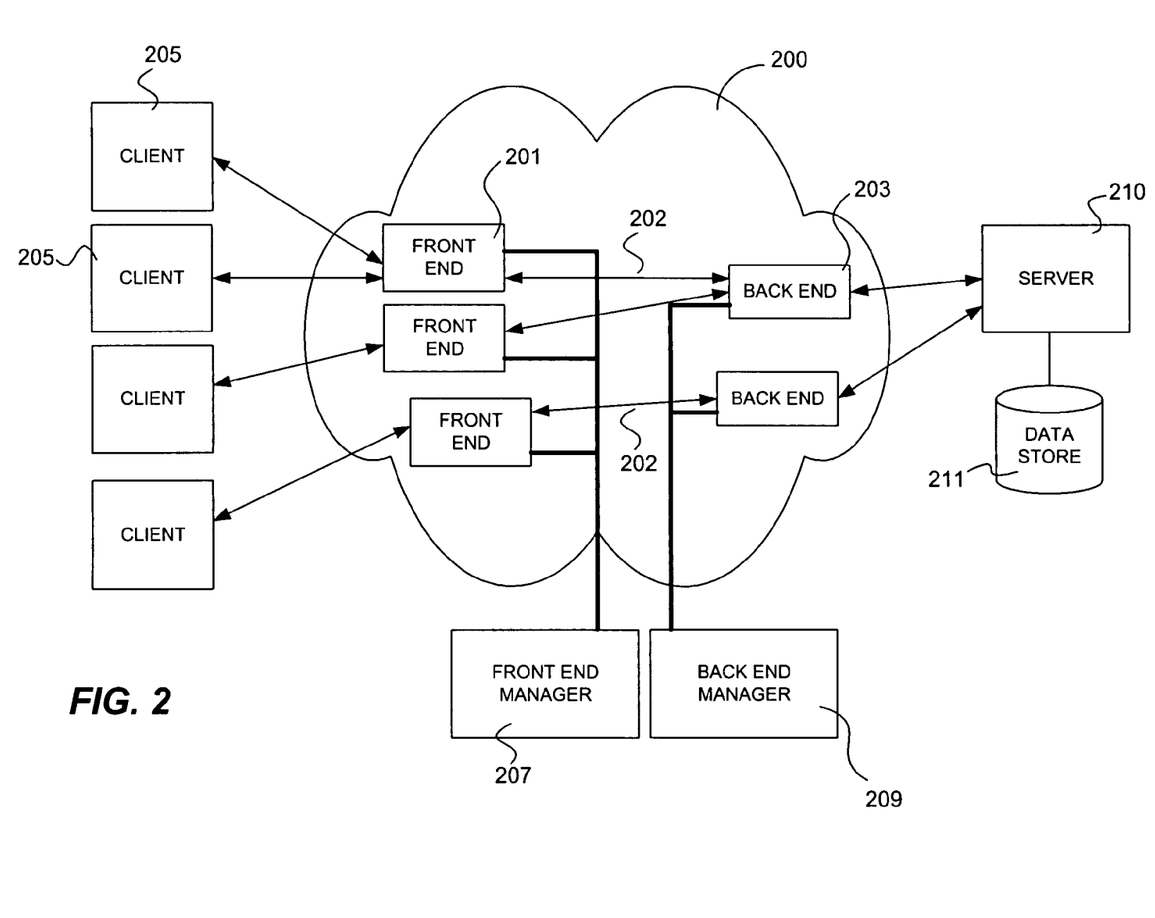
FIG. 2 shows in block-diagram form significant components of a system in accordance with the present invention.

The present invention operates in a manner akin to a private network 200 implemented within the Internet infrastructure. Private network 200 expedites and prioritizes communications between a client 205 and a data server 210. In the exemplary implementations, two intermediary computers, front-end 201 and back-end 203, are used cooperatively as intermediary servers to process database access requests and provide data services. However, it is contemplated that a single intermediary computer (i.e., either front-end 201 or back-end 203) or more than two intermediary computers, may be used to still provide and implement improved access to a data server 210.

In the specific examples herein client 205 comprises a network-enabled graphical user interface such as a web browser. However, the present invention is readily extended to client software other than conventional web browser software. Any client application that can access a standard or proprietary user level protocol for network access is a suitable equivalent. Examples include client applications that act as front ends for file transfer protocol (FTP) services, voice over Internet protocol (VOIP) services, network news protocol (NNTP) services, multi-purpose internet mail extensions (MIME) services, post office protocol (POP) services, simple mail transfer protocol (SMTP) services, as well as Telnet services. In addition to network protocols, the client application access a network application such as a database management system (DBMS) in which case the client application generates query language, (e.g., structured query language or "SQL") messages. In wireless appliances, a client application may communicate via wireless application protocol (WAP) service or other like protocols.

Data server 210 implements connectivity to network devices such as back-end 203 to receive and process requests for data from data store 211. Data server 210 can be implemented as a database including relational, flat, and object oriented databases. Alternatively, data server 210 may comprise a virtual database that accesses one or more other databases. Further, data server 210 may be a data storage device or network file system that responds to requests by fetching data.

Front-end mechanism 201 serves as an access point for client-side communications. In one example, front-end 201 comprises a computer that sits "close" to clients 205. By "close", "topologically close" and "logically close" it is meant that the average latency associated with a connection between a client 205 and a front-end 201 is less than the average latency associated with a connection between a client 205 and a data server 210. Desirably, front-end computers have as fast a connection as possible to the clients 205. For example, the fastest available connection may be implemented in point of presence (POP) of an Internet service provider (ISP) 106 used by a particular client 205. However, the placement of the front-ends 201 can limit the number of browsers that can use them. Because of this, in some applications, it may be more practical to place one front-end computer in such a way that several POPs can connect to it. Greater distance between front-end 201 and clients 205 may be desirable in some applications as this distance will allow for selection amongst a greater number front-ends 201 and thereby provide significantly different routes to a particular back-end 203. This may offer benefits when particular routes and/or front-ends become congested or otherwise unavailable.

Transport mechanism 202 is implemented by cooperative actions of the front-end 201 and back-end 203. Back-end 203 processes and directs data communication to and from data server 210. Transport mechanism 202 communicates data packets using a proprietary protocol over the Internet infrastructure in the particular example. Hence, the present invention does not require heavy infrastructure investments and automatically benefits from improvements implemented in the general-purpose network 101. Unlike the general-purpose Internet, front-end 201 and back-end 203 are programmably assigned to serve accesses to a particular data server 210 at any given time.

It is contemplated that any number of front-end and back-end mechanisms may be implemented cooperatively to support the desired level of service required by the data server owner. The present invention implements a many-to-many mapping of front-ends to back-ends. Because the front-end to back-end mappings can by dynamically changed, a fixed hardware infrastructure can be logically reconfigured to map more or fewer front-ends to more or fewer back-ends and web sites or servers as needed.

In one embodiment, front-end 201 and back-end 203 are closely coupled to the Internet backbone. This means they have high bandwidth connections, can expect fewer hops, and have more predictable packet transit time than could be expected from a general-purpose connection. Although it is preferable to have low latency connections between front-ends 201 and back-ends 203, a particular strength of the present invention is its ability to deal with latency by enabling efficient transport and traffic prioritization. Hence, in other embodiments front-end 201 and/or back-end 203 may be located farther from the Internet backbone and closer to clients 205 and/or data servers 210. Such an implementation reduces the number of hops required to reach a front-end 201 while increasing the number of hops within the link 202 thereby yielding control over more of the transport path to the management mechanisms of the present invention.

Clients 205 no longer conduct all data transactions directly with the data server 210. Instead, clients 205 conduct some and preferably a majority of transactions with front-ends 201, which simulate, emulate, or actually implement the functions of data server 210. Client data and requests are then sent, using link 202, to the backend 203 and then to the data server 210. Running multiple clients 205 over one large connection provides several advantages:

Since all client data is mixed, each client can be assigned a priority. Higher priority clients, or clients requesting higher priority data, can be given preferential access to network resources so they receive access to the channel sooner while ensuring low-priority clients receive sufficient service to meet their needs.

The large connection between a front-end 201 and back-end 203 can be permanently maintained, shortening the many TCP/IP connection sequences normally required for many clients connecting and disconnecting.

A particular advantage of the architecture shown in FIG. 2 is that it is readily scaled. In accordance with the present invention, not only can the data itself be distributed, but the data service functionality and behavior is readily and dynamically ported to any of a number of intermediary computers in contrast to conventional database systems where the database functionality is confined to a particular server or limited set of servers. In this manner, any number of client machines 205 may be supported. In a similar manner, a database owner may use multiple data servers 210 that are co-located or distributed throughout network 101. To avoid congestion, additional front-ends 201 may be implemented or assigned to particular databases. Each front-end 201 is dynamically re-configurable by updating address parameters to serve particular web sites. Client traffic is dynamically directed to available front-ends 201 to provide load balancing. Hence, when quality of service drops because of a large number of client accesses to a particular database, an additional front-end 201 can be assigned to the database and subsequent client requests directed to the newly assigned front-end 201 to distribute traffic across a broader base.

In the particular examples, this is implemented by a front-end manager component 207 that communicates with multiple front-ends 201 to provide administrative and configuration information to front-ends 201. Each front-end 201 includes data structures for storing the configuration information, including information identifying the IP addresses of data servers 210 to which they are currently assigned. Other administrative and configuration information stored in front-end 201 may include information for prioritizing particular data, quality of service information, and the like.

Similarly, additional back-ends 203 can be assigned to a database to handle increased traffic. Back-end manager component 209 couples to one or more back-ends 203 to provide centralized administration and configuration service. Back-ends 203 include data structures to hold current configuration state, quality of service information and the like. In the particular examples, front-end manager 207 and back-end manager 209 serve multiple data servers 210 and so are able to manipulate the number of front-ends and back-ends assigned to each data server 210 by updating this configuration information. When the congestion for the database subsides, the front-end 201 and back-end 203 can be reassigned to other, busier databases. These and similar modifications are equivalent to the specific examples illustrated herein.

In the case of web-based environments, front-end 201 is implemented using custom or off-the-shelf web server software. Front-end 201 is readily extended to support other, non-web-based protocols, however, and may support multiple protocols for varieties of client traffic. Front-end 201 processes the data traffic it receives, regardless of the protocol of that traffic, to a form suitable for transport by link 202 to a back-end 203. Hence, most of the functionality implemented by front-end 201 is independent of the protocol or format of the data received from a client 205. Hence, although the discussion of the exemplary embodiments herein relates primarily to front-end 201 implemented as a web server, it should be noted that, unless specified to the contrary, web-based traffic management and protocols are merely examples and not a limitation of the present invention.

As shown in FIG. 2, in accordance with the present invention, a database is effectively implemented using an originating data server 210 operating cooperatively with the web server of front-end 201. More generally, any network service (e.g., FTP, VoIP, NNTP, MIME, SMTP, Telnet, DBMS) can be implemented using a combination of an originating server working cooperatively with a front-end 201 configured to provide a suitable interface (e.g., FTP, VOIP, NNTP, MIME, SMTP, Telnet, DBMS, WAP) for the desired service. In contrast to a simple front-end cache or proxy software, implementing a server in front-end 201 enables portions of the database and/or database functionality to actually be implemented in and served from both locations. The actual database contents and service (e.g., management and updating of the database contents) being delivered may comprise a composite of the portions generated at each server.

Significantly, however, the web server in front-end 201 is close to the browser in a client 205 whereas the originating server is close to all resources available at the web hosting center at which data server 210 is implemented. This difference enables the data server 210 or other network service to be implemented so as to take advantage of the unique topological position each entity has with respect to the client 205. By way of a particular example, assume an environment in which the front-end server 201 is located at the location of an ISP used by a particular set of clients 205. In such an environment, clients 205 can access the front-end server 205 without actually traversing the network 101.

Figure 3:
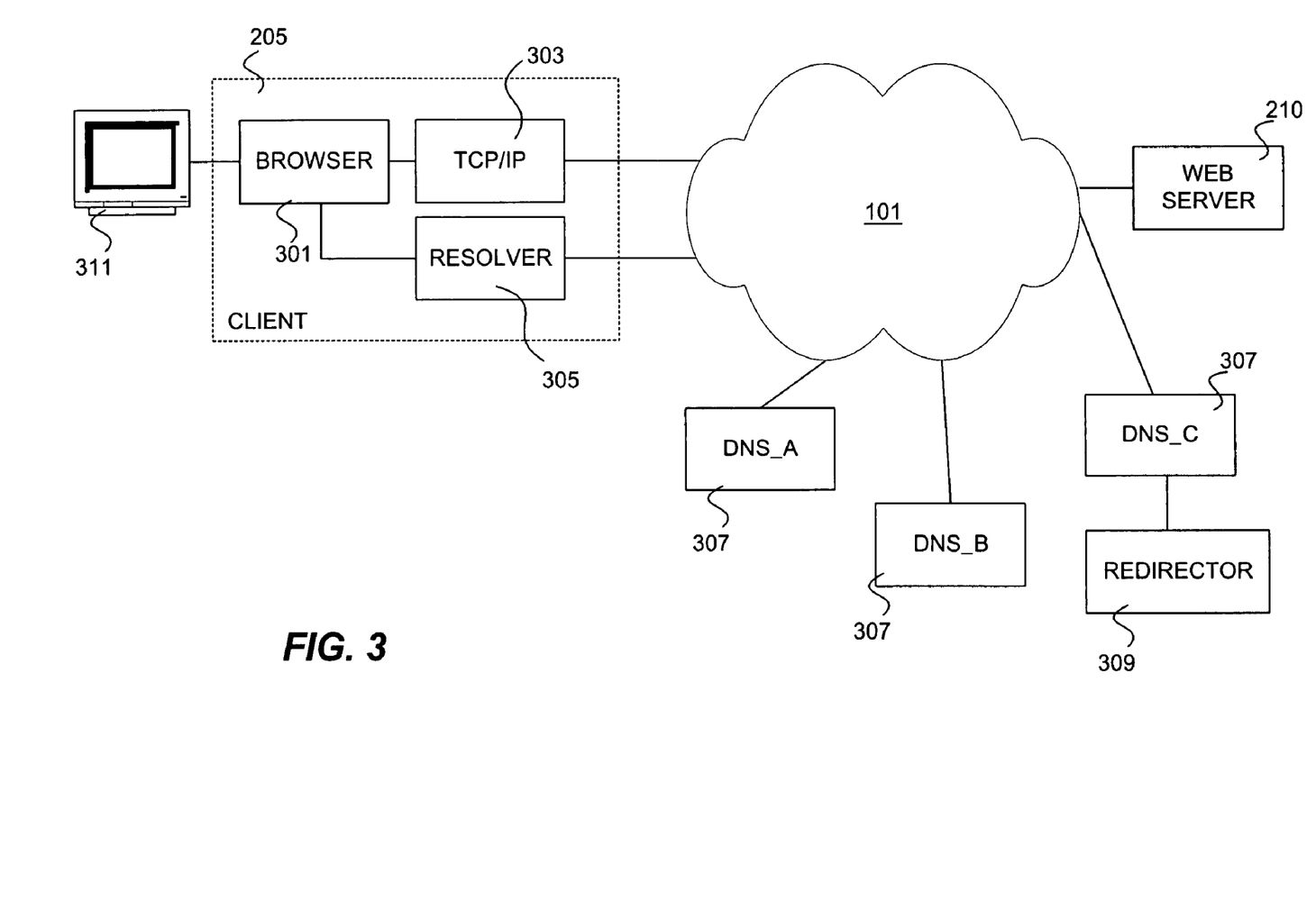
FIG. 3 shows a domain name system used in an implementation of the present invention.

In order for a client 205 to obtain service from a front-end 201, the front-end 201 to provide the service must be selected from the constellation of FEs. Preferably, client 205 does not need to be aware of the location of front-end 201, and initiates all transactions as if it were contacting the originating server 210. FIG. 3 illustrates a domain name server (DNS) redirection mechanism that illustrates how a client 205 is connected to a front-end 201. The DNS systems is defined in a variety of Internet Engineering Task Force (IETF) documents such as RFC0883, RFC 1034 and RFC 1035 which are incorporated by reference herein. In a typical environment, a client 205 executes a browser 301, TCP/IP stack 303, and a resolver 305. For reasons of performance and packaging, browser 301, TCP/IP stack 303 and resolver 305 are often grouped together as routines within a single software product.

Browser 301 functions as a graphical user interface to implement user input/output (I/O) through monitor 311 and associated keyboard, mouse, or other user input device (not shown). Browser 301 is usually used as an interface for web-based applications, but may also be used as an interface for other applications such as email and network news, as well as special-purpose applications such as database access, telephony, and the like. Alternatively, a special-purpose user interface may be substituted for the more general-purpose browser 301 to handle a particular application.

TCP/IP stack 303 communicates with browser 301 to convert data between formats suitable for browser 301 and IP format suitable for Internet traffic. TCP/IP stack also implements a TCP protocol that manages transmission of packets between client 205 and an Internet service provider (ISP) or equivalent access point. IP protocol requires that each data packet include, among other things, an IP address identifying a destination node. In current implementations, the IP address comprises a 32-bit value that identifies a particular Internet node. Non-IP networks have similar node addressing mechanisms. To provide a more user-friendly addressing system, the Internet implements a system of domain name servers that map alpha-numeric domain names to specific IP addresses. This system enables a name space that is more consistent reference between nodes on the Internet and avoids the need for users to know network identifiers, addresses, routes and similar information in order to make a connection.

The domain name service is implemented as a distributed database managed by domain name servers (DNSs) 307 such as DNS_A, DNS_B and DNS_C shown in FIG. 3. Each DNS relies on <domain name:IP> address mapping data stored in master files scattered through the hosts that use the domain system. These master files are updated by local system administrators. Master files typically comprise text files that are read by a local domain name server, and hence become available through the domain name servers 307 to users of the domain system.

The user programs (e.g., clients 205) access name servers through standard programs such as resolver 305. Resolver 305 includes an address of a DNS 307 that serves as a primary name server. When presented with a reference to a domain name for a data server 210, resolver 305 sends a request to the primary DNS (e.g., DNS_A in FIG. 3). The primary DNS 307 returns either the IP address mapped to that domain name, a reference to another DNS 307 which has the mapping information (e.g., DNS_B in FIG. 3), or a partial IP address together with a reference to another DNS that has more IP address information. Any number of DNS-to-DNS references may be required to completely determine the IP address mapping.

In this manner, the resolver 305 becomes aware of the IP address mapping which is supplied to TCP/IP component 303. Client 205 may cache the IP address mapping for future use. TCP/IP component 303 uses the mapping to supply the correct IP address in packets directed to a particular domain name so that reference to the DNS system need only occur once.

In accordance with the present invention, at least one DNS server 307 is owned and controlled by system components of the present invention. When a user accesses a network resource (e.g., a database), browser 301 contacts the public DNS system to resolve the requested domain name into its related IP address in a conventional manner. In a first embodiment, the public DNS performs a conventional DNS resolution directing the browser to an originating server 210 and server 210 performs a redirection of the browser to the system owned DNS server (i.e., DNC_C in FIG. 3). In a second embodiment, domain:address mappings within the DNS system are modified such that resolution of the originating server's domain automatically return the address of the system-owned DNS server (DNS_C). Once a browser is redirected to the system-owned DNS server, it begins a process of further redirecting the browser 301 to the best available front-end 201.

Unlike a conventional DNS server, however, the system-owned DNS_C in FIG. 3 receives domain:address mapping information from a redirector component 309. Redirector 309 is in communication with front-end manager 207 and back-end manager 209 to obtain information on current front-end and back-end assignments to a particular server 210. A conventional DNS is intended to be updated infrequently by reference to its associated master file. In contrast, the master file associated with DNS_C is dynamically updated by redirector 309 to reflect current assignment of front-end 201 and back-end 203. In operation, a reference to data server 210 may result in an IP address returned from DNS_C that points to any selected front-end 201 that is currently assigned to data server 210. Likewise, data server 210 can identify a currently assigned back-end 203 by direct or indirect reference to DNS_C.

Front-end 201 typically receives information directly from front-end manager 207 about the address of currently assigned back-ends 203. Similarly, back-end 203 is aware of the address of a front-end 201 associated with each data packet. Hence, reference to the domain system is not required to map a front-end 201 to its appropriate backend 203.

Figure 4A:
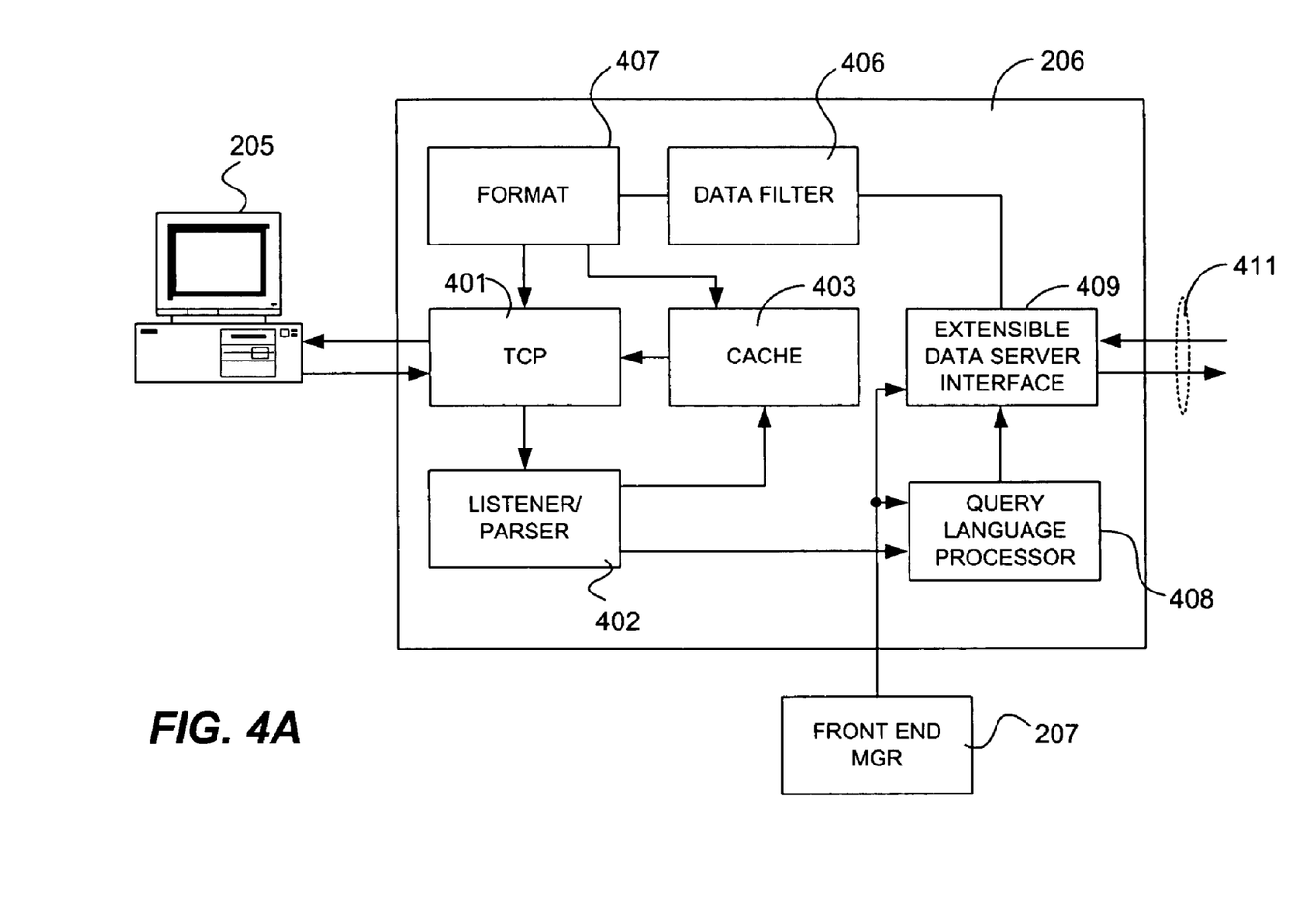
FIG. 4 shows front-end components of FIG. 2 in greater detail.
Figure 4B:
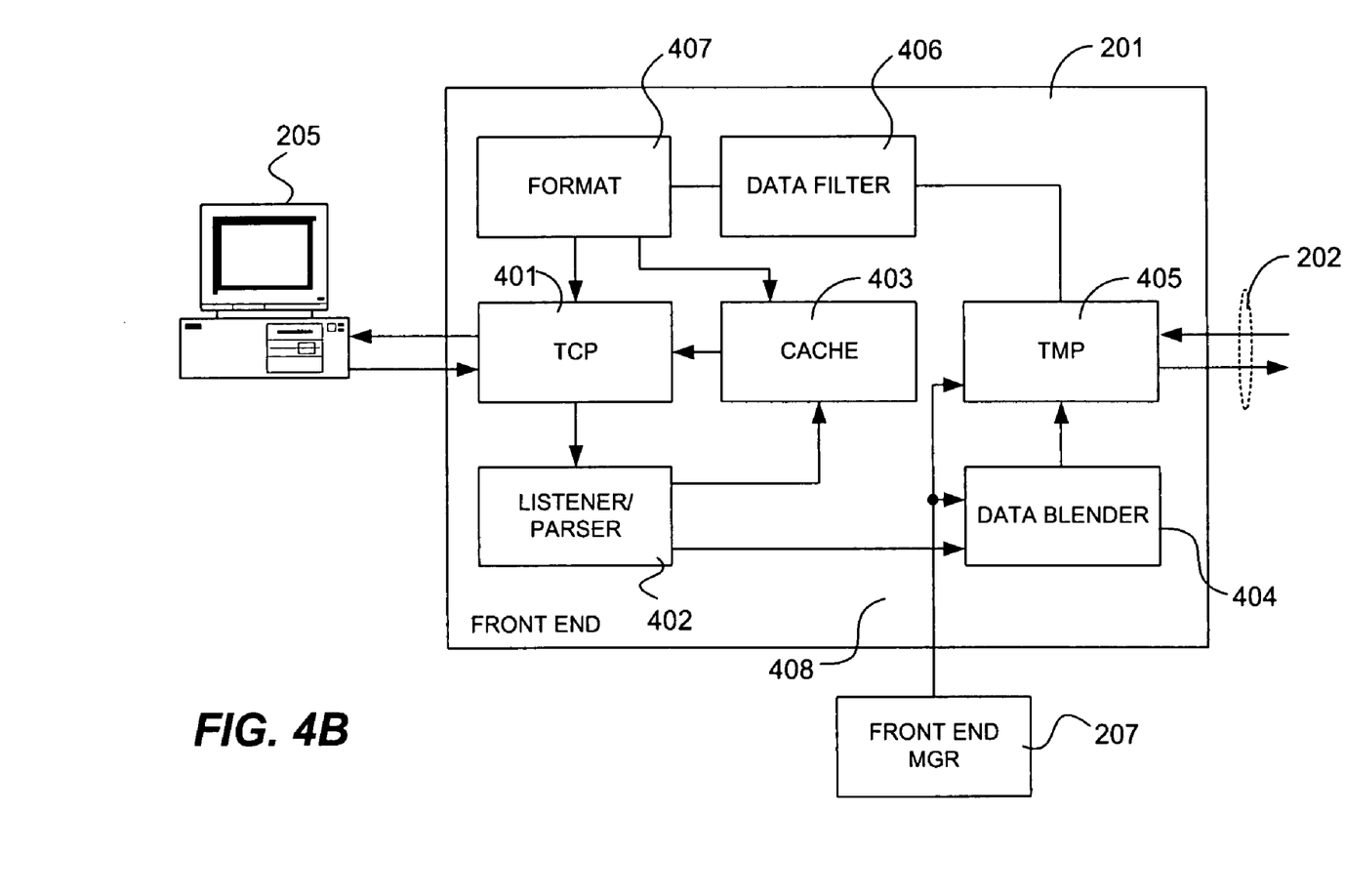
Figure 4C:
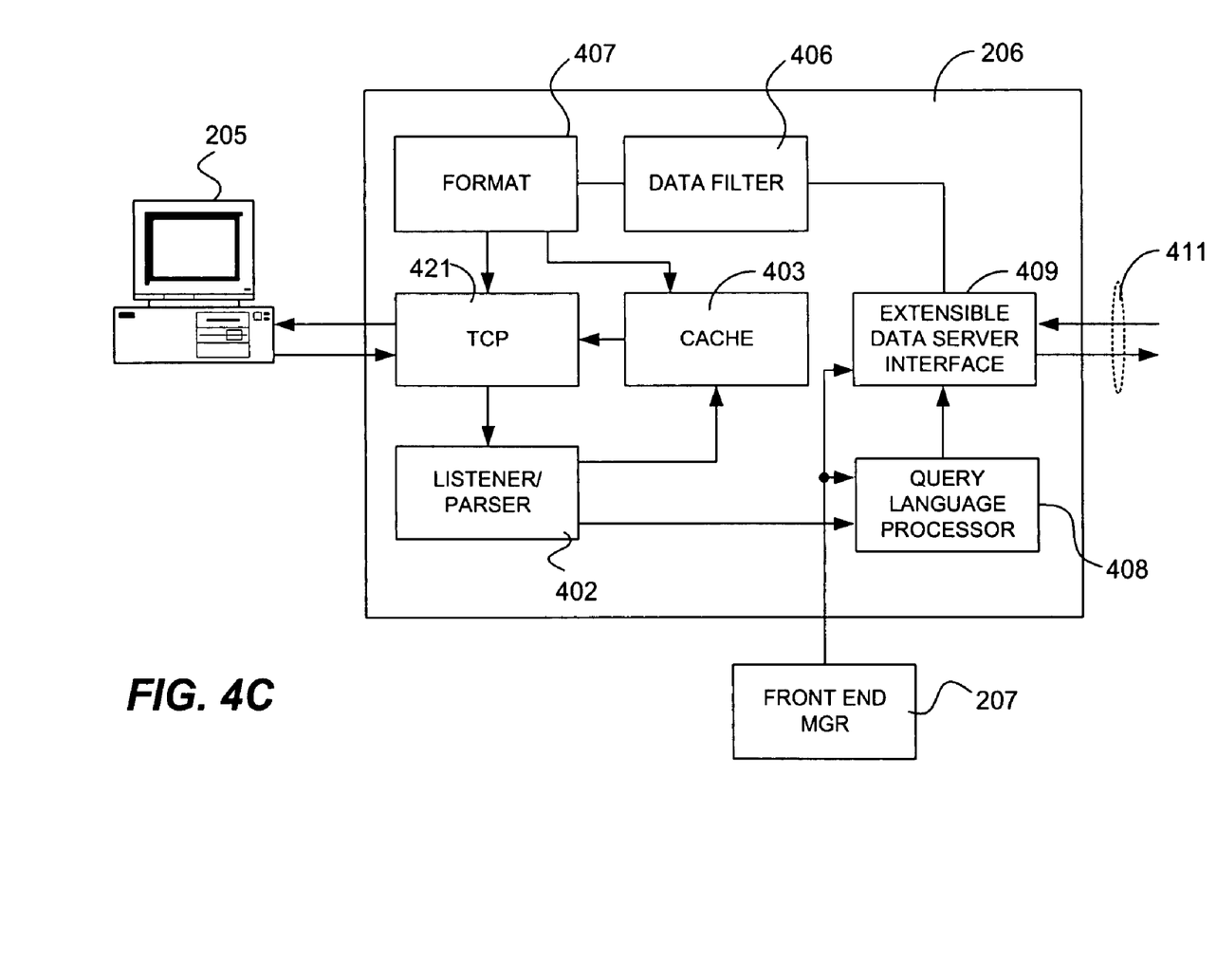
Figure 5:
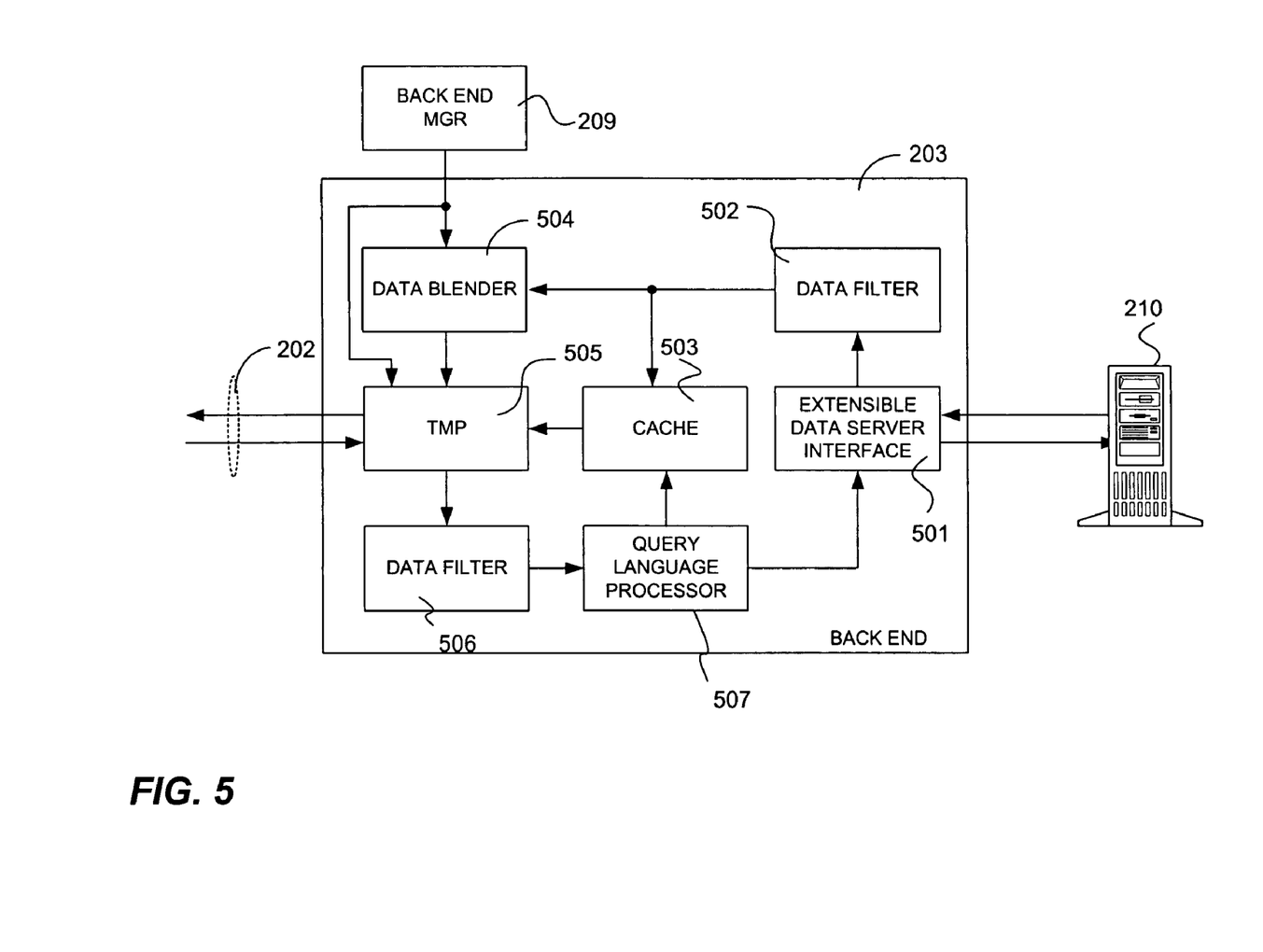
FIG. 5 shows back-end components of FIG. 2 in greater detail.

FIG. 4A illustrates a first embodiment in which a single intermediary computer 206 is used, whereas FIG. 4B and FIG. 5 illustrate a second embodiment where both front-end 201 and back-end 203 are used to implement the intermediary server. Because of their similarities, FIG. 4A and FIG. 4B are described together with their differences noted.

Primary functions of the intermediary server 206 (FIG. 4A) and front-end 201 (FIG. 4B) and in include listening for and accepting incoming connection requests from client applications. Listener processes launch other processes to handle subsequent communications with the client. Intermediary server 206 also handles prioritizing amongst multiple client requests, and applying the client requests to data servers in an order based upon the prioritization. It is contemplated that the various functions described in reference to the specific examples may be implemented using a variety of data structures and programs operating at any location in a distributed network. For example, a front-end 201 or intermediary server 206 may be operated on a network appliance 107 or server within a particular network 102, 103, or 104 shown in FIG. 1. The present invention is readily adapted to any application where multiple clients are coupling to a centralized resource. Moreover, other transport protocols may be used, including proprietary transport protocols.

The present invention is described in terms of a specific implementation in which clients 205 communicate using TCP/IP protocols. TCP component 401 includes devices for implementing physical connection layer and Internet protocol (IP) layer functionality. Current IP standards are described in IETF documents RFC0791, RFC0950, RFC0919, RFC0922, RFC792, RFC1112 that are incorporated by reference herein. For ease of description and understanding, these mechanisms are not described in great detail herein. Where protocols other than TCP/IP are used to couple to a client 205, TCP component 401 is replaced or augmented with an appropriate network protocol process.

TCP component 401 communicates TCP packets with one or more clients 205. Received packets are coupled to listener/parser 402 where the Internet protocol (or equivalent) information is extracted. TCP is described in IETF RFC0793 which is incorporated herein by reference. Each TCP packet includes header information that indicates addressing and control variables, and a payload portion that holds the user-level data being transported by the TCP packet. The user-level data in the payload portion typically comprises a user-level network protocol datagram.

Listener/parser 402 analyzes the payload portion of the TCP packet. In some examples herein, HTTP is employed as the transport layer protocol because of its widespread use and the advantage that currently available browser software is able to readily use HTTP. HTTP can be used in conjunction with hypertext markup language (HTML) and extensible markup language (XML) user-level protocols to exchange information with clients 205, although other user-level protocols may be equivalently substituted. More generally, listener/parser 402 can be implemented as any parser-type logic implemented in hardware or software for interpreting the contents of the payload portion. Listener/parser 402 may implement file transfer protocol (FTP), mail protocols such as simple mail transport protocol (SMTP), structured query language (SQL), and the like. Any user-level protocol, including proprietary protocols, may be implemented within the present invention using appropriate modification of listener/parser 402.

In particular examples, a database-specific user protocol is used in which case listener processes accepts incoming connection requests from client applications in a manner similar to how a database listener process would accept the request. The listener processes may start up other processes to handle subsequent communications with the client 205 such that from the perspective of client 205, it is connected to an appropriate database server rather than an intermediary server 206.

To improve performance, front-end 201 optionally includes a caching mechanism 403. Cache 403 may be implemented as a passive cache that stores frequently and/or recently accessed database content or as an active cache that stores database content that is anticipated to be accessed. In addition, cache 403 may store information regarding the structure and relationships of the database. Upon receipt of a TCP packet, listener/parser 402 determines if the packet is making a request for data within cache 403. If the request can be satisfied from cache 403, the data is supplied directly without reference to data server 210 (i.e., a cache hit). Cache 403 implements any of a range of management functions for maintaining fresh content. For example, cache 403 may invalidate portions of the cached content after an expiration period specified with the cached data or by data server 210. Also, cache 403 may proactively update the cache contents even before a request is received for particularly important or frequently used data from data server 210. Cache 403 evicts information using any desired algorithm such as least recently used, least frequently used, first in/first out, or random eviction. When the requested data is not within cache 403, a request is processed to data server 210, and the returned data may be stored in cache 403.

Several types of packets will cause listener/parser 404 to forward a request towards data server 210. For example, a request for data that is not within cache 403 (or if optional cache 403 is not implemented) will require a reference to data server 210. Some packets will comprise data that may be required to be supplied to data server 210 (e.g., customer credit information, form data and the like). In these instances, HTTP parser 402 couples to data blender 404.

In the embodiment of FIG. 4A the intermediary server 206 may be located topologically near the client 205 or data server 210—either alternative provides some advantage and the choice of location is made to meet the needs of a particular application. Query language processor 408 receives a parsed request and formulates it into a proper (i.e., syntactically correct) database query. This feature allows the client 205 to be unaware of specific query requirements of a particular database, and allows a particular request to be applied to a variety of database types. For example, a query may be presented from a client 205 in an Oracle-compliant format, but be applied to one or more database management systems including Informix, Sybase, Microsoft SQL server, or proprietary database management systems. Moreover, a client 205 may present a query in the form of an HTML input form or XML object while query language processor 408 transforms the query into a DBMS-specific query/request. Further, requests are readily reformatted so as to reduce the load on the database itself. For example, SQL allows several alternative expressions that logically refer to a similar data set, but each expression may have distinctly different processor loads on the DBMS trying to resolve the request. Query language processor can modify a request or query to improve efficient execution in the DBMS to which it will be applied.

The formulated query is passed to transport component 409 for communication to data server 210 over channel 411. Channel 411 is compatible with an interface to data server 210 which may include an interface such as Ethernet, Fibre channel, or other available physical and transport layer interfaces. In a particular example, transport component 409 is implemented using extensible data server interface such as the Java database components (JDBC) that enable plug-in extensions to support particular database formats.

Data server 210 returns responses to transport component 409 and supplies them to data filter 406 and/or format component 407. Data filter component may filter and/or constrain database contents returned in the response. Data filter implements these functions typically implemented in a DBMS. Data filter component 406 is optionally used to implement data decompression where appropriate, decryption, and handle caching when the returning data is of a cacheable type. Format component 407 formats the response into a format suitable for use by client 205, for example, a web page transported as HTTP packets, or a query language response with an appropriate format for the user-level protocol used by client 205.

Where two intermediary computers are used as in the example of FIG. 4B and FIG. 5, front-end 201 is responsible for translating packets from client 205 into transport morphing protocol™ (TMP™) packets used in the system in accordance with the present invention. Transport morphing protocol and TMP are trademarks or registered trademarks of Circadence Corporation in the United States and other countries. Query formation may take place in back-end 203. Query language processing may require knowledge of the database structure and schema of the target data server 210. This knowledge will take the form of a mapping table, for example, that maps field identifications within a data server 210 to fields present in parsed request packets. Such information may be more readily applied in a back-end 203. Conversely, HTTP formatting component 407 is more preferably implemented in front-end 201 where knowledge of a particular client 205 may be more readily available.

Optionally, front-end 201, back-end 203, and intermediary computer 206 implement security processes, compression processes, encryption processes and the like to condition the received data for improved transport performance and/or provide additional functionality. These processes may be implemented within any of the functional components (e.g., data blender 404) or implemented as separate functional components within front-end 201. Also, parser 402 may identify priority information transmitted with a request. The prioritization value may be provided by the owners of data server 210 or third parties, for example, and may be dynamically altered, statically set, or updated from time to time to meet the needs of a particular application. Prioritization may also be based upon any combination of criteria including a business identity associated with a client 205, geographic location of client 205, topological location of client 205, historical use statistics, and the like. Moreover, priority values may be computed to indicate aggregate priority over time, and/or combine priority values from different sources to compute an effective priority for each database request.

In the embodiment of FIG. 4B and FIG. 5, blender 404 slices and/or coalesces the data portions of the received packets into a more desirable "TMP units" that are sized for transport through the TMP mechanism 202. The data portion of TCP packets may range in size depending on client 205 and any intervening links coupling client 205 to TCP component 401. Moreover, where compression is applied the compressed data will vary in size depending on the compressibility of the data. Data blender 404 receives information from front-end manager 207 that enables selection of a preferable TMP packet size. Alternatively, a fixed TMP packet size can be set that yields desirable performance across TMP mechanism 202. Data blender 404 also marks the TMP units so that they can be re-assembled at the receiving end.

Data blender 404 also serves as a buffer for storing packets from all clients 205 that are associated with front-end 201. Blender 404 mixes data packets coming into front-end 201 into a cohesive stream of TMP packets sent to back-end 203 over TMP link 202. In creating a TMP packet, blender 404 is able to pick and choose amongst the available data packets so as to prioritize some date packets over others. Prioritization is effected by selectively transmitting request and response data from multiple sources in an order determined at least partially, by a priority value associated with the particular request and response. For purposes of the present invention, any algorithm or criteria may be used to assign a priority.

TMP mechanisms 405 and 505 implement the TMP protocol in accordance with the present invention. TMP is a TCP-like protocol adapted to improve performance for multiple connections operating over a single channel. Front-end TMP mechanism 405 and corresponding back-end TMP mechanism 505 shown in FIG. 5 are computer processes that implement the end points of TMP link 202. The TMP mechanism in accordance with the present invention creates and maintains a stable connection between two processes for high-speed, reliable, adaptable communication.

Another feature of TMP is its ability to channel numerous TCP connections through a single TMP pipe 202. The environment in which TMP resides allows multiple TCP connections to occur at one end of the system. These TCP connections are then combined into a single TMP connection. The TMP connection is then broken down at the other end of the TMP pipe 202 in order to traffic the TCP connections to their appropriate destinations. TMP includes mechanisms to ensure that each TMP connection gets enough of the available bandwidth to accommodate the multiple TCP connections that it is carrying.

Another advantage of TMP as compared to traditional protocols is the amount of information about the quality of the connection that a TMP connection conveys from one end to the other of a TMP pipe 202. As often happens in a network environment, each end has a great deal of information about the characteristics of the connection in one direction, but not the other. By knowing about the connection as a whole, TMP can better take advantage of the available bandwidth.

FIG. 5 illustrates principle functional components of an exemplary back-end 203 in greater detail. Primary functions of the back-end 203 include serving as a proxy for client 205 from the perspective of data server 210, translating TCP packets from data server 210 into TMP packets as well as translating TMP packets from front end 201 into the one or more corresponding TCP packets generated by clients 205.

TMP unit 505 receives TMP packets from TMP pipe 202 and passes them to HTTP reassemble unit 507 where they are reassembled into the corresponding TCP packets. Data filter 506 may implement other functionality such as decompression, decryption, and the like to meet the needs of a particular application. The reassembled data is forwarded to TCP component 501 for communication with data server 210.

TCP data generated by the data server process are transmitted to TCP component 501 and forwarded to data filter 502. Data filter 502 operates in a manner analogous to data filter 406 shown in FIG. 4A and FIG. 4B. Data blender 504 operates in a manner akin to data blender 404 shown in FIG. 4B to buffer and prioritize packets in a manner that is efficient for TMP transfer. Priority information is received by, for example, back-end manager 209 based upon criteria established by the web site owner. TMP data is streamed into TMP unit 505 for communication on TMP pipe 202.

Figure 6:
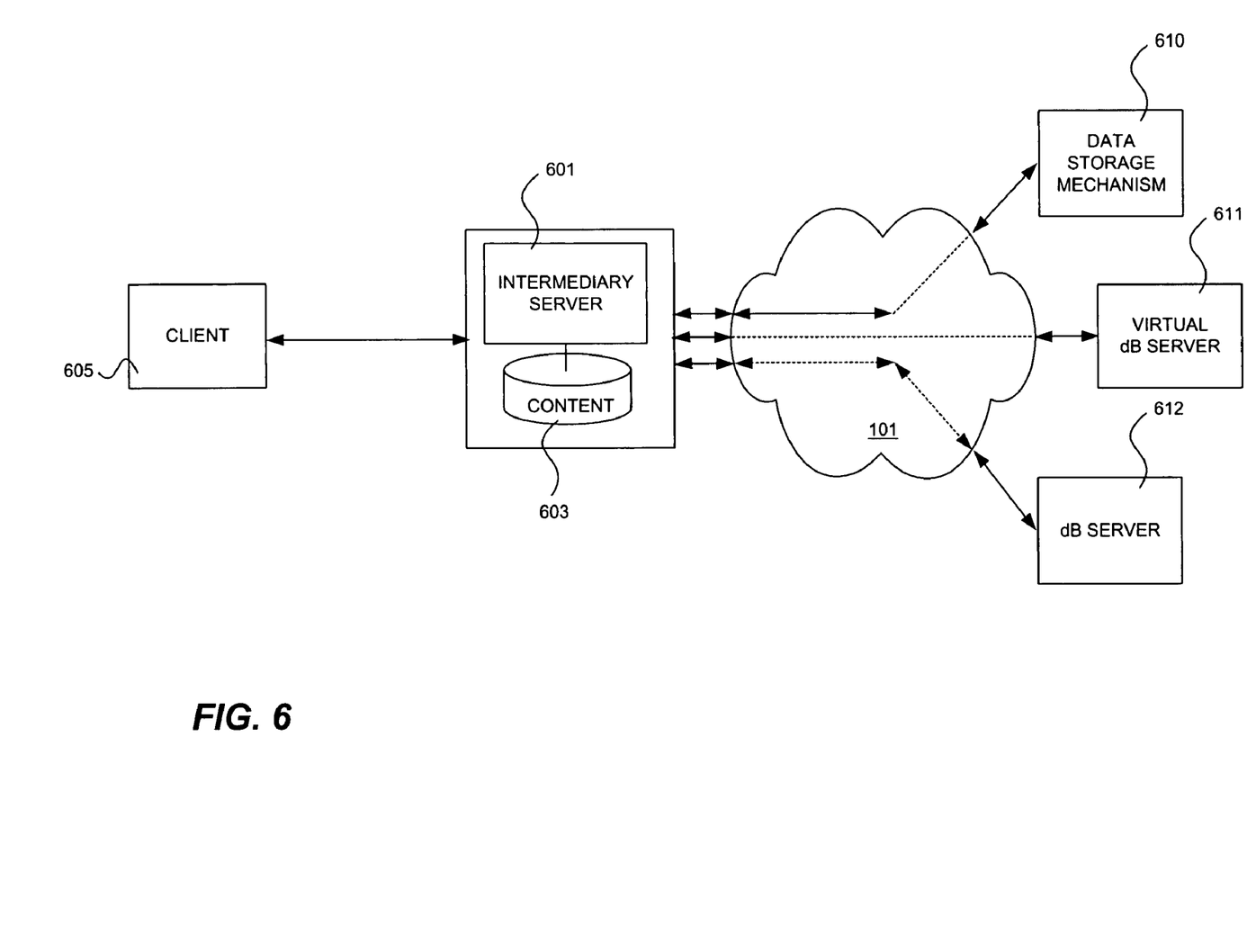
FIG. 6 shows a conceptual block diagram of the system of FIG. 2 in an alternative context.

FIG. 6 illustrates operation of an embodiment of the present invention in block diagram form. In FIG. 6, client 605 generates database access requests to read, write, modify or otherwise manipulate the content of specified data existing in one or more of storage mechanism 610, virtual database server 611, or database server 612. Intermediary server 601 receives the database access request from client 605, as well as a plurality of other clients 605 (not shown). Intermediary server 601 may be either the single server solution shown in FIG. 4A or the multiple-server solution shown in FIG. 4B and FIG. 5. Moreover, intermediary server 601 may be implemented by any number of servers in a manner similar to that shown in the implementation of FIG. 4B and FIG. 5.

The format and communication protocols used between client 605 and intermediary server 601 are independent of the actual databases 610, 611 and 612 in the preferred implementation. Intermediary 601 determines if it has access to the requested content from a local database or cache 603. When available, intermediary 601 serves a response without reference to the originating data server 610, 611 or 612. As needed, intermediary server 601 generates and communicates properly formatted queries to appropriate databases 610, 611, and 612 to obtain the requested database contents.

Intermediary server 601 can select which of the available servers 610–612 a particular request will be applied, and can apply requests against more than one server 610–612. Servers 610–612 may replicate or mirror some data elements in which case intermediary server can select a particular server 610–612 based upon which server will provide faster service or based upon load balancing or other criteria.

In the event one or more servers 610–612 are unavailable or busy, intermediary server 601 can direct requests to an available server, or to an server that can provide alternate responses to the particular client request. This feature is particularly useful for providing high-availability database access with minimal difficult for database operators. An intermediary server 601 can access any number of database sites 610–612 to obtain requested data. This allows automatic fail-over when one or more servers 610–612 become unavailable, and load balancing amongst available servers. A client request can be dynamically re-routed from one data server (e.g., server 610) to an alternate server (e.g., server 612) without need for informing the client or implementing any redirection processes in client 205 (as rerouting is handled in the intermediary 601).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, while devices supporting HTTP data traffic are used in the examples, the HTTP devices may be replaced or augmented to support other public and proprietary protocols including FTP, NNTP, SMTP, SQL and the like. In such implementations the front-end 201 and/or back end 203 are modified to implement the desired protocol. Moreover, front-end 201 and back-end 203 may support different protocols such that the front-end 201 supports, for example, HTTP traffic with a client and the back-end supports a DBMS protocol such as SQL. Such implementations not only provide the advantages of the present invention, but also enable a client to access a rich set of network resources with minimal client software.

We claim:

1. A database system comprising:

a communication network;

a plurality of client applications coupled to the network and generating database access requests;

a set comprising two or more intermediary servers coupled to the network to receive the requests wherein the set comprises at least a first computer located logically close to the client application and configured to receive the database access requests and a second computer located logically close to the data storage mechanism and configure to communicate with the interface of the data storage mechanism;

an enhanced communication channel between the first and second computers, wherein the enhanced communication channel provides at least one of improved quality of service, lower latency, prioritization services, and higher security transport relative to a basic transport mechanism defined for data transport on the communication network;

a data storage mechanism coupled to the network at topological position with respect to the client applications that is unique from a topological position of the intermediary servers, and having an interface for communicating with the intermediary servers;

means within the at least one intermediary server responsive to a received database access request for establishing a channel with the data storage mechanism to obtain data from the data storage mechanism in response to a received client request; and means within the at least one intermediary server for formatting the obtained data in a manner suitable for use by one of the client applications that requested the associated database access.

2. The database system of claim 1 wherein at least one of the client applications database management system (DBMS) client and the intermediary servers comprise listener processes configured to accept requests from the DBMS client.

3. The database system of claim 1 wherein at least one of the client applications comprises a web browser application and the database access requests comprise HTTP requests.

4. The database system of claim 1 wherein the intermediary server comprises a web server having one or more interfaces for receiving the database access requests and communicate with the data storage mechanism interface.

5. The database system of claim 1 wherein the intermediary server is topologically close to the client applications and topologically distant from the data storage mechanism.

6. The database system of claim 1 wherein the communication channel supports prioritization of database access requests and responses to database access requests.

7. A method for serving database content comprising:
providing a communication network;
generating requests for database content to be provided from a data storage mechanism using a plurality of client applications coupled to the network;
providing a set of intermediary servers coupled to the network to receive the requests from client applications wherein the set of intermediary servers comprises at least a first computer located logically close to a computer generating a request, wherein the first computer is configured to receive the database access requests and a second computer located logically close to the data storage mechanism and configure to communicate with the interface of the data storage mechanism;
providing an enhanced communication channel between the first and second computers wherein the enhanced communication channel provides at least one of improved quality of service, lower latency, prioritization services, and higher security transport relative to a basic transport mechanism defined for data transport on the communication network;
providing the data storage mechanism coupled to the network at topological position with respect to the client applications that is unique from a topological position of the intermediary servers, and having an interface for communicating with the intermediary server;
causing the second computer of the set of intermediary servers to access the data storage mechanism in response to receiving a request from a client application from the first computer over the communication channel;
using the intermediary server to format database content obtained from the data storage mechanism to a format usable by the client application; and
delivering the formatted database content to the client application that generated the request for database content.

8. The method of claim 7 wherein the act of generating requests for database content comprises generating a database management system (DBMS) client query and the act of receiving the request comprises implementing a DBMS listener process in the intermediary server configured to detect the DBMS client query.

9. The method of claim 7 prioritizing at least one request for database content over other requests for database content at least partially based on content-based prioritization criteria specified by the database owner.

10. The method of claim 7 prioritizing at least one request for database content over other requests for database content at least partially based on user priority information, wherein the user priority information is based upon identification of a user associated with the client application generating the at least one request.

11. The method of claim 10 wherein the user priority information is specified by the database owner.

12. The method of claim 10 wherein the user priority information is derived from content priority information aggregated from a plurality of database content requests.

13. The method of claim 7 further comprising:
causing the intermediary server to issue a remote procedure call to the data storage mechanism over the established channel to initiate the transport of data.

14. The method of claim 7 further comprising:
causing the data storage mechanism to issue a remote procedure call to the intermediary server over the established channel to initiate the formatting and delivery of the database content using the data obtained from the data storage mechanism.

15. A method for serving database content cormprising:
generating requests for database content from data storage mechanism using a plurality of client applications;
providing an intermediary server coupled to receive the requests from client applications;
providing a data storage mechanism coupled to the network at a first logical position that is unique from a second logical position of the intermediary servers, and having an interface for communicating with the intermediary server;
providing an enhanced communication channel between the intermediary server and the data storage mechanism, wherein the enhanced communication channel provides improved quality of service, lower latency, prioritization services, or higher security transport relative to a basic transport mechanism defined for data transport on the communication network;
causing the intermediary server to determine availability of the data storage mechanism in response to receiving a request from a client application;
using the intermediary server to obtain substitute database content in response to determining that the data storage mechanism is busy/unavailable; and
delivering the substitute content to the client application that generated the request for database content.

16. A method for serving database content comprising:
generating requests for database content from data storage mechanism using a plurality of client applications;
providing a plurality of intermediary servers coupled receive the requests from client applications;
providing a database management system coupled to the network at a first logical position that is unique from a second logial position of the intermediary servers, and having an interface for communicating with the intermediary server providing an enhanced communication channel between at least one of the intermediary server and the data management system, wherein the enhanced communication channel provides improved quality of service, lower latency, prioritization services, or higher security transport relative to a basic transport mechanism defined for data transport on the communication network;

implementing at least some of the database management system in local data storage within the intermediary servers;

causing an intermediary server to respond to at least some received requests using the local data storage rather than by accessing the database management system coupled to the network.

17. The method of claim 16 further comprising:

redirecting a request for database content to a selected one of the intermediary servers, wherein the selected intermediary server is selected based upon its ability to respond to the request using the local data storage within the selected intermediary server.

* * * * *